United States Patent
Horoho et al.

(10) Patent No.: US 9,754,364 B1
(45) Date of Patent: Sep. 5, 2017

(54) SYSTEM AND METHOD FOR DETECTING MISMATCHED PAGES

(71) Applicant: Amazon Technologies, Inc., Seattle, WA (US)

(72) Inventors: Scott William Horoho, Redmond, WA (US); Arun Lakshmi Narayanan, Loma Linda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 14/720,377

(22) Filed: May 22, 2015

(51) Int. Cl.
  *G06K 9/00* (2006.01)
  *G06T 7/00* (2017.01)
  *G06K 9/46* (2006.01)
  *B42D 15/00* (2006.01)

(52) U.S. Cl.
  CPC ............ *G06T 7/0008* (2013.01); *B42D 15/00* (2013.01); *G06K 9/4609* (2013.01)

(58) Field of Classification Search
  None
  See application file for complete search history.

(56) References Cited

U.S. PATENT DOCUMENTS

| | | | | |
|---|---|---|---|---|
| 5,276,628 A | * | 1/1994 | Schneiderhan | G06K 5/00 271/259 |
| 2004/0173958 A1 | * | 9/2004 | Graushar | B42C 19/04 270/52.02 |
| 2006/0123969 A1 | * | 6/2006 | Fujita | B26D 7/025 83/697 |
| 2008/0309957 A1 | * | 12/2008 | Horiuchi | G06K 9/3208 358/1.9 |
| 2009/0296993 A1 | * | 12/2009 | Mestha | B42C 11/02 382/112 |
| 2011/0007965 A1 | * | 1/2011 | Cyr | G06T 7/0006 382/165 |
| 2011/0279866 A1 | * | 11/2011 | Matheson | G06K 15/02 358/1.15 |
| 2013/0114914 A1 | * | 5/2013 | Dejean | G06K 9/00469 382/317 |
| 2014/0340714 A1 | * | 11/2014 | Hiraishi | G06F 3/1208 358/1.18 |

\* cited by examiner

*Primary Examiner* — Manuchehr Rahmjoo
(74) *Attorney, Agent, or Firm* — Lee & Hayes, PLLC

(57) ABSTRACT

Systems and methods using registration marks to detect page mismatches when making physical books are described. The system can be configured to capture an image of a plurality of pages, analyze the plurality of pages to determine whether a page does not include a registration mark, and provide results of the analyzing. In one example, if individual pages of the plurality of pages include the registration mark, then the results can include a message indicating that the plurality of pages are associated with the physical book. However, if one page of the plurality of pages lacks the registration mark, then the results can include a message indicating that the plurality of pages are associated with at least two physical books.

20 Claims, 14 Drawing Sheets

SYSTEM AND METHOD FOR DETECTING MISMATCHED PAGES

BACKGROUND

Consumers today use online marketplaces to purchase physical books and other reading materials. In many cases, when a consumer purchases a book using an online marketplace, a publisher associated with the online marketplace physically makes the book for the consumer. For example, the publisher may retrieve a digital version of the book, print the book onto paper using the digital version of the book, cut the paper in order to create the pages of the book, and then finish making the book by binding the pages together.

Problems can arise when making a physical book using the current process. For instance, publishers that make physical books are usually making more than one physical book at a time, and pages from a first physical book may get mixed in with pages from a second physical book before the second physical book is bound. As a result, the finished second physical book will include one or more pages from the first physical book, and thus be defective.

In order to try to solve this problem, publishers have adopted methods to insure that all of the pages belong to a single physical book before the binding process. Existing methods include weighing or measuring the pages of the physical book to ensure that the correct number of pages are present. However, such methods include a tolerance for error and thus, a finished physical book may still include one or more pages that belong to a different physical book.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
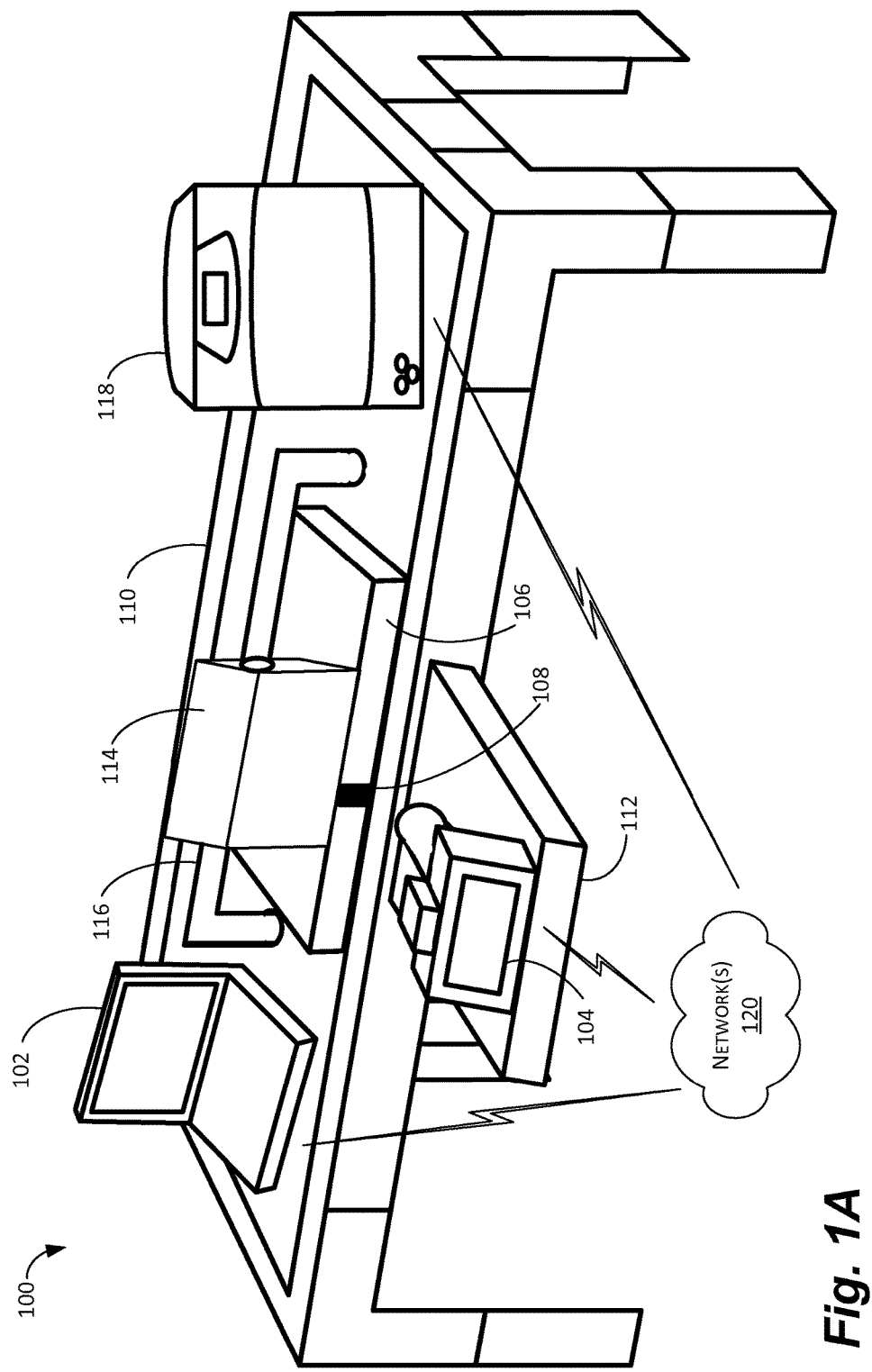
FIG. 1A is an isometric view of an example system for detecting mismatched physical books.

Examples of the present disclosure relate generally to processes for making physical books, and specifically to techniques using registration marks to detect page mismatches when making physical books. In some examples, the techniques include retrieving a digital version of a physical book and printing the digital version of the physical book on sheets of paper using a printing device. In some examples, the printing device can print a registration mark that is associated with the physical book on the sheets of paper. In some examples, the printing device prints the registration mark in the middle of the sheets of paper. In this manner, during a cutting process, the sheets of paper are cut through the registration mark such that each page of the physical book includes the registration mark. In other examples, the printing device can print the registration mark on the edges of the sheets of paper such that each page of the physical book still includes the registration mark after the cutting process.

In various examples, the registration mark includes one or more humanly perceptible marks (e.g., lines, blocks, squares, shapes, designs, etc. made by applying, printing, embossing, etc.) on a side of the pages of the physical book. In this manner, a device (such as an infrared camera, black light camera, or other scanning or image capture device) and/or user can determine whether each of the pages is associated with the physical book based on the pages including the same or common registration mark. In some examples, the registration mark includes one or more marks (e.g., lines, blocks, squares, shapes, designs, etc. made by applying, printing, embossing, etc.) that are not humanly perceptible located on a side of the pages of the physical book. In this manner, a device (such as an infrared camera, black light camera, or other scanning or image capture device) can be used to detect the non-visible mark and determine whether each of the pages is associated with the physical book based on the pages including the same or common non-visible registration mark. Still, in other examples, the registration mark can include a notch, cut, or other known defect in the pages of the physical book. In such examples, the registration mark need not be applied or printed onto or embossed in the sheets. A device and/or user can then determine whether each of the pages is associated with the physical book based on the pages including the same or common registration mark (e.g., defect, notch, or other cut pattern).

In order to detect the registration mark on the pages of the physical book, a user and/or machine can first process the pages by stacking the pages on top of each other. In some examples, this process can include placing the pages into a device that holds the pages in place laterally while at the same time clamping the pages together. For instance, this process can be similar to preparing the pages of the physical book for a binding process. As such, this process can be performed on a binding table and/or another surface.

After preparing the pages of the physical book for the detection, an imaging device can capture one or more images of the pages. In some examples, the imaging device can include a camera that takes one or more pictures of the registration mark on the pages. In various examples, the imaging device can include a scanner that analyzes the registration mark on the pages. The registration mark can include a visible or non-visible mark (e.g., an ink marking and/or embossing) applied printed on a side of the pages or a defect, notch, or cut into a side of the pages, as described above. In some examples, the imaging device can include a device with an image sensor that can detect a non-visible registration mark (e.g., non-visible ink or some other non-visible material) that is applied or printed on a side of the pages of the physical book. For instance, the device can include an infrared camera or scanner that captures a non-visible registration mark located on a side of the pages of the physical book.

Once the imaging device captures the one or more images of the pages, a computing device can analyze the images to determine whether or not the pages in the images are all associated with the same physical book. In some examples, the imaging device can also include the computing device that analyzes the images to determine whether all of the pages in the images are associated with the same physical book. In other examples, a separate computing device analyzes the images to determine whether all of the pages in the images are associated with the same physical book. For instance, the imaging device can send the images to a computing device and the computing device can analyze the images. The imaging device can send the images to the computing device using any wired and/or wireless connection, which is described below.

In order to analyze one or more images to determine whether all of the pages in the images are associated with a single physical book, the computing device uses the registration mark on the pages. In some examples, the computing device can determine that the pages are not associated with a single physical book (and/or associated with two or more physical books) based on at least one of the pages not including the registration mark or including a different registration mark. In other examples, the computing device can determine that all of the pages are associated with the same physical book based on all of the pages in the image including the same or common registration mark. Still in other examples, the computing device can determine that all of the pages are associated with the same physical book based on a threshold number of pages from the images including (and/or not including) the registration mark. For instance, the computing device can determine that all of the pages are associated with the same physical book based on a threshold percentage, e.g., ninety percent, of the pages including the registration mark.

If the computing device determines that the pages are associated with the same physical book, the process can then include binding the pages together to finish making the physical book. In some examples, before binding the pages together with a cover, a user and/or machine first trims the pages by cutting the edges of the pages off such that the pages are cut to standard and/or specific dimensions. In trimming the pages, the registration mark can be cut off the pages so that the finished physical book does not include the registration mark. In other examples, binding the pages together may not include trimming the edges of the pages and/or cutting the registration mark off the pages. In such examples, binding the pages of the physical book can include attaching the cover of the physical book to the side of the pages that includes the registration mark. As such, the cover of the physical book can cover the registration mark such that the registration mark will not be visible to a consumer.

If the computing device determines that the pages are associated with at least two physical books, such as by determining that at least one of the pages does not include the registration mark or includes a different registration mark, an error may be indicated and/or the process may then be stopped. In some examples, the process can be repeated from the beginning until the computing device determines that the pages in one or more images are associated with the same physical book. In other examples, a user and/or machine removes the pages that do not include the registration mark that is associated with the physical book from the rest of the pages. The imaging device can then capture a new set of one or more images of the remaining pages and the computing device can analyze the new set of one or more images to determine whether or not the remaining pages are associated with the physical book.

FIG. 1A is an isometric view of a system 100 for detecting mismatched pages of physical books. In some examples, the various devices and/or components of system 100 include computing device 102, imaging device 104, and printing device 118. Computing device 102 can represent, but is not limited to, a desktop computer, a server computer, a web-server computer, a personal computer, a mobile computer, a laptop computer, a tablet computer, a wearable computer, an integrated component for inclusion in a computing device, an appliance, or any other sort of computing device. Imaging device 104 can represent, but is not limited to, a digital camera, a disposable camera, a video camera, a thermal camera, an infrared camera, a scanner, or any other sort of imaging device that can capture images and/or videos. Finally, printing device 118 can represent, but is not limited to, a laser printer, a dot-matrix printer, an ink-jet or bubble-jet printer, a dye diffusion printer, or any other sort of printing device that can print books and/or other content.

In some examples, computing device 102 can communicate with imaging device 104 and printing device 118 via one or more network(s) 120. For instance, network(s) 120 can include public networks such as the Internet, private networks such as an institutional and/or personal intranet, or some combination of private and public networks. Network(s) 120 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 120 can utilize communications protocols, including packet-based and/or datagram-based protocols such as internet protocol (IP), transmission control protocol (TCP), user datagram protocol (UDP), or other types of protocols. Moreover, network(s) 120 can also include a number of devices that facilitate network communications and/or form a hardware basis for the networks, such as switches, routers, gateways, access points, firewalls, base stations, repeaters, backbone devices, and the like.

In some examples, network(s) 120 can further include devices that enable connection to a wireless network, such as a wireless access point (WAP). Such examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In some examples, computing device 102 and/or an external computing device (not shown) can communicate with printing device 118 to cause printing device 118 to print a physical book. For instance, computing device 102 can receive a request to print a physical version of a digital book in response to a consumer using an online marketplace to acquire the physical book. In some examples, computing device 102 may store the digital version of the physical book in a computer-readable medium (illustrated in FIG. 3) and send a message via network(s) 120 to printing device 118 that causes printing device 118 to apply, print, and/or create the physical book. In other examples, an external computing device may store the digital version of the physical book and send a message via network(s) 120 to printing device 118 that causes printing device 118 to apply, print, and/or create the physical book.

In some examples, printing device 118 can apply, print, and/or create pages 106 of the physical book by applying, printing, and/or creating the content of the physical book on one or more sheets of paper. As used herein, a sheet of paper means any material on which a user and/or machine can print content. Printing device 118 can further apply, print, and/or create a registration mark 108 on the one or more sheets of paper in addition to the content. In other examples, printing device 118 can apply, print, and/or create the content of the physical book on one or more sheets of paper that already include the registration mark 108. For instance, printing device 118 can apply, print, and/or create the content of the physical book on sheets of paper that include a notch or other defect, where the notch or other defect corresponds to the registration mark 108. In one or more of examples described above, after printing device 118 finishes applying, printing, and/or creating the content of the physical book on the sheets of paper, the sheets of paper can be cut in half and stacked on top of each other to create pages 106 of the physical book, which is described in detail in FIG. 4.

After creating pages 106 for the physical book, a user and/or machine can secure pages 106 to table 110 using securing mechanism 114. In some examples, securing mechanism 114 can be attached to table 110 using connectors 116, such as a clamp, bar, or other connectors. Securing mechanism 114 includes a clamp, weight, or other device configured to apply pressure to the top of pages 106 in order to secure pages 106 to table 110. In other examples, securing mechanism 114 and/or connectors 116 can further include one or more mechanisms that hold pages 106 in place laterally. For instance securing mechanism 114 and/or connectors 116 can include additional clamps and/or supports that help laterally secure pages 106 in place on table 110. Still in other examples, table 110 can correspond to a binding table configured for the binding process of making a physical book. In such examples, securing mechanism 114 and/or connectors 116 can include any device and/or mechanism configured to secure pages 106 in place while binding pages 106.

Once pages 106 are secured, imaging device 104 can capture one or more images of pages 106. In some examples, imaging device 104 captures a side (illustrated in FIG. 1B) of pages 106 where registration mark 108 is located. Registration mark 108 can be located on any side of pages 106, such as the head (top edge), tail (bottom edge), back edge, or front edge of pages 106. In other examples, imaging device 104 captures a top (illustrated in FIG. 1C) or bottom of pages 106. When capturing a top or bottom of pages 106, imaging device 104 can capture an entire view of pages 106 and/or only capture an edge of pages 106. Additionally, still in other examples, more than one imaging device can capture one or more images of pages 106. For instance, imaging device 104 may capture one or more images of the side of pages 106 while a second imaging device (not illustrated) captures one or more images of either the top or bottom of pages 106.

In some examples, as discussed above, imaging device 104 includes a digital camera that captures one or more images of pages 106. For instance, registration mark 108 can include a visible registration mark (such as an ink marking and/or embossing) and/or a notch or other defect on the side of pages 106. Imaging device 104 can then capture one or more images of the visible registration mark and/or the notch or defect on the side of pages 106. In other examples, imaging device 104 includes an infrared camera and/or other type of camera that captures one or more images using infrared radiation and/or any other type of imaging sensor that detects non-visible material. For instance, registration mark 108 may include a non-visible registration mark and imaging device 104 may include a camera with an imaging sensor that is capable of capturing an image of the non-visible registration mark. Still in other examples, imaging device 104 can further include an accessory (such as a black light) that can illuminate a non-visible registration mark on pages 106 so that imaging device 104 can capture one or more images of registration mark 108.

In capturing an image of pages 106, in some examples, imaging device 104 can take one or more pictures of pages 106 including registration mark 108. In other examples, imaging device 104 can take a video of pages 106 including registration mark 108. Imaging device 104 can then send the image of pages 106 including registration mark 108 to computing device 102 so that computing device 102 can detect whether pages 106 are associated with (belong to) a single physical book or whether pages 106 are associated with (belong to) two or more physical books.

In some examples, detecting whether pages 106 are associated with a single physical book includes analyzing the image of pages 106 to determine whether one or more of pages 106 do not include registration mark 108. If computing device 102 determines that one or more of pages 106 do not include registration mark 108, then computing device 102 can determine that pages 106 are associated with more than one physical book. In other examples, detecting whether pages 106 are associated with a single physical book includes analyzing the image of pages 106 to determine whether every page of pages 106 includes the same or common registration mark 108. If computing device 102 determines that every page of pages 106 includes the same or common registration mark 108, then computing device 102 can determine that pages 106 are associated with a single physical book.

Still, in other examples, detecting whether pages 106 are associated with a single physical book includes analyzing the image of pages 106 to determine whether a threshold number of pages 106 include (and/or do not include) the same or common registration mark 108. For instance, computing device 102 and/or a user can set a threshold number of pages 106 that must include the same or common registration mark 108 in order for computing device 102 to determine that pages 106 are associated with a single physical book. In setting the threshold number of pages, a computing device and/or a user can base the threshold number of pages as either a number of pages and/or a percentage of pages. For example, computing device 102 can determine that pages 106 are associated with a single physical book based on at least ninety-eight percent of pages 106 including the same or common registration mark 108.

In some examples, each of registration marks 108 on the sides of pages 106 can differ from one another slightly based on errors in applying, printing, and/or creating registration mark 108 on pages 106. In such examples, computing device 102 can be programmed to detect whether pages 106 are associated with a single physical book based on these errors. For example, one or more of registrations marks 108 on the sides of pages 106 can be located a specific distance to the left or right of the other registration marks 108 on the sides of the other pages 106 even though all of pages 106 are associated with a single physical book. Computing device 102 can thus be programmed to account for the errors in applying, printing, and/or creating registration mark 108 onto pages 106 by determining whether the specific distance to the left or right is greater than a set threshold distance for error detection.

After detecting whether or not pages 106 are associated with a physical book, computing device 102 can further provide a message indicating that pages 106 are or are not associated with the physical book. In some examples, computing device 102 can display the message using a display device, such as the display of computing device 102. In other examples, computing device 102 can send the message to another electronic device, such as a mobile device of a user making the physical book. The system 100 can then use the message to determine whether or not to proceed with making the physical book.

For instance, computing device 102 may determine that pages 106 are associated with a single physical book. Based on the determination, a user and/or machine can process pages 106 in order to finish making the physical book. In some examples, the user and/or machine can first put pages 106 through a trimming process in order to trim pages 106 to standard and/or specific dimensions. When trimming pages 106, registration mark 108 can be cut off pages 106 so that registration mark is not visible on the physical book after pages 106 are bound with a cover. In other examples, the user and/or machine can bind pages 106 with a cover without performing the trimming process. For instance, the user and/or machine can bind pages 106 with a cover that covers registration mark 108 so that registration mark 108 is not visible on the physical book. Still, in other examples, pages 106 can be bound in a way that does not cover registration mark 108, however, registration mark 108 can include a non-visible registration mark such that registration mark 108 is still not visible on the physical book.

Although the various devices and/or components of system 100 are illustrated as being separate devices and/or components, the illustration of system 100 is not intended to be limiting. In some examples, one or more of the various devices and/or components of system 100 can be combined. For instance, computing device 102 and imaging device 104 can include a single electronic device that performs the features described above. In other examples, one or more of the various devices and/or components of system 100 may be separated into multiple electronic devices. For instance, a separate computing device can send a message to printing device 118 that causes printing device 118 to print the physical book.

Moreover, the various devices and/or components of system 100 can be separate from table 110 and/or attached to table 110 using additional methods. In some examples, attachment 112 that attaches imaging device 104 to table 110 can include, but is not limited to, clamps, bolts, a detachable table, or any other sort of connecting mechanism that can attach imaging device 104 to table 110. In other examples, one or more of computing device 102, imaging device 104, and/or printing device 118 can be separate from table 110.

Figure 1B:
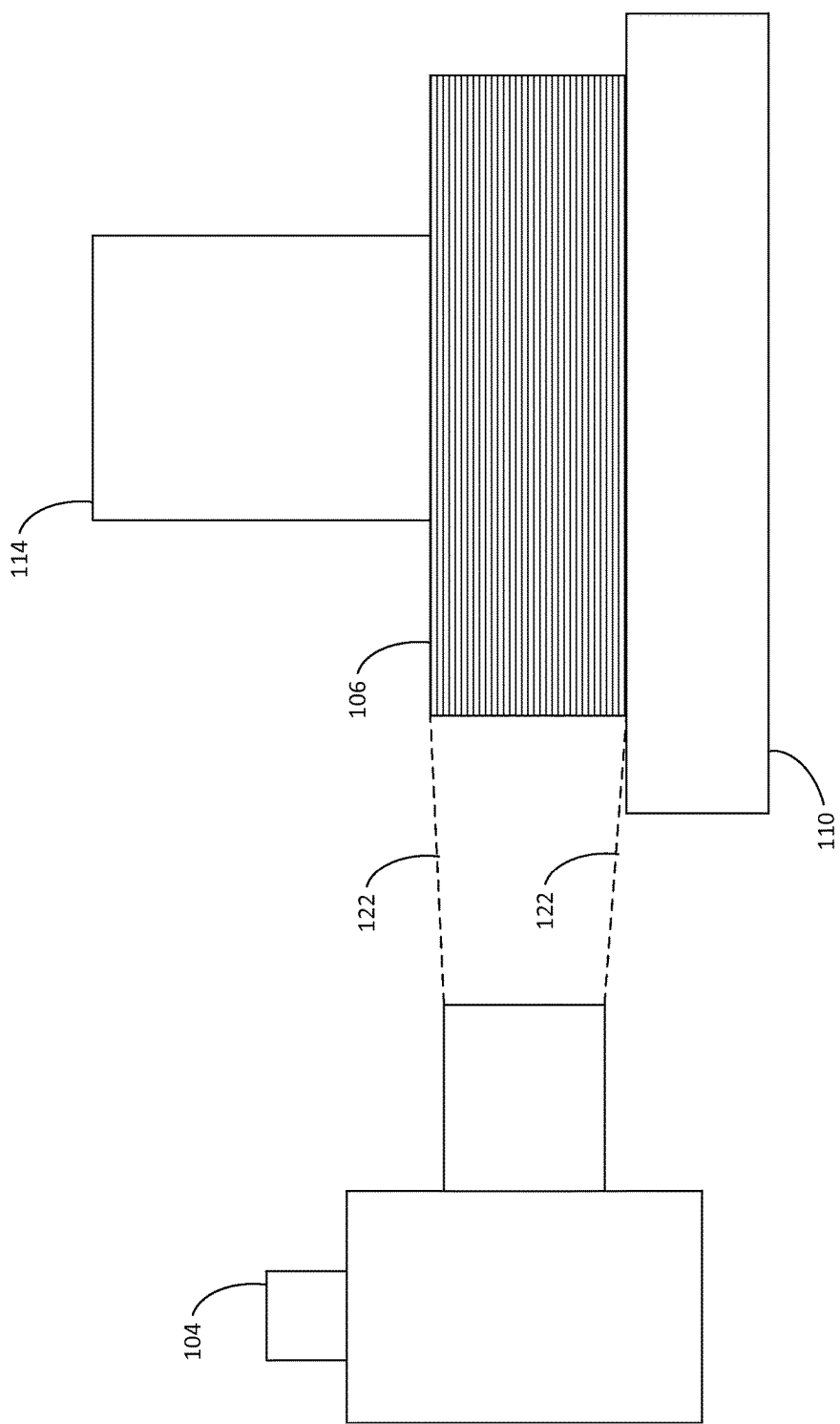
FIG. 1B is a view of an example imaging device capturing a side image of pages.

FIG. 1B is a view of imaging device 104 capturing a side image of pages 106, which is illustrated by dashed lines 122. Imaging device 104 can be configured to capture an image of any side of pages 106. For instance, imaging device 104 can capture an image of the head, tail, front edge, or back edge of pages 106. In some examples, imaging device 104 can be configured to capture an image of the entire side of pages 106. In other examples, imaging device 104 can be configured to capture one or more images that focuses on a specific location on the side of pages 106, such as the location of registration mark 108 on the side of pages 106.

Figure 1C:
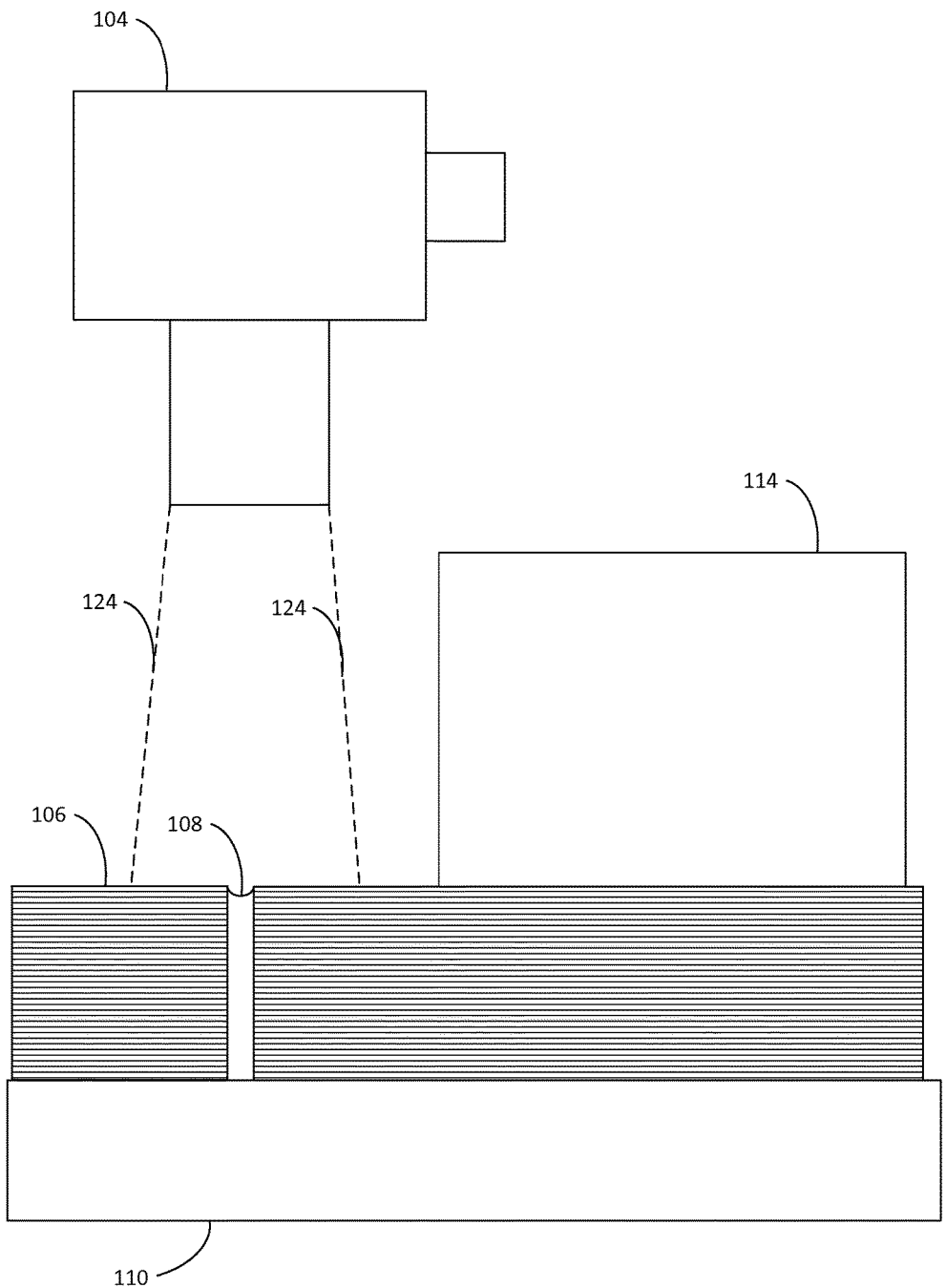
FIG. 1C is a view of an example imaging device capturing a top image of pages.

FIG. 1C is a view of imaging device 104 capturing a top image of pages 106, which is illustrated by dashed lines 124. Imaging device 104 can be configured to capture an image of the top (or bottom) of pages 106 when registration mark 108 includes a notch or other defect in the side of pages. In some examples, imaging device 104 can be configured to capture an image of the entire top (or bottom) of pages 106. In other examples, imaging device 104 can be configured to capture one or more images that focuses on a specific location on the top (or bottom) of pages, such as the edge of pages 106 that includes registration mark 108.

Figure 2A:
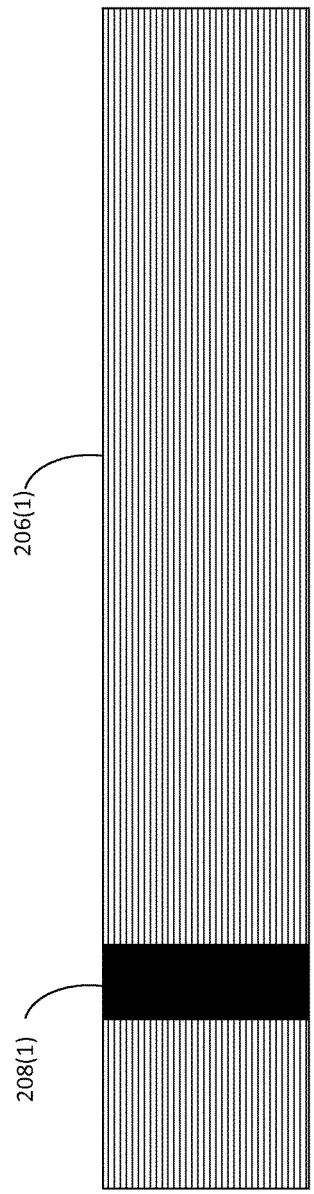
FIG. 2A is a first side view of pages that include a matching registration mark, in accordance with some examples of the present disclosure.

FIG. 2A is a side view of pages 206(1) of a physical book that include a matching registration mark 208(1). As FIG. 2A illustrates, registration mark 208(1) includes a marking down the sides of pages 206(1), such as a visible and/or non-visible marking applied, printed, and/or created on pages 206(1). Computing device 102 can detect that pages 206(1) are associated with a single physical book based on pages 206(1) including the same or common registration mark 208(1).

Figure 2B:
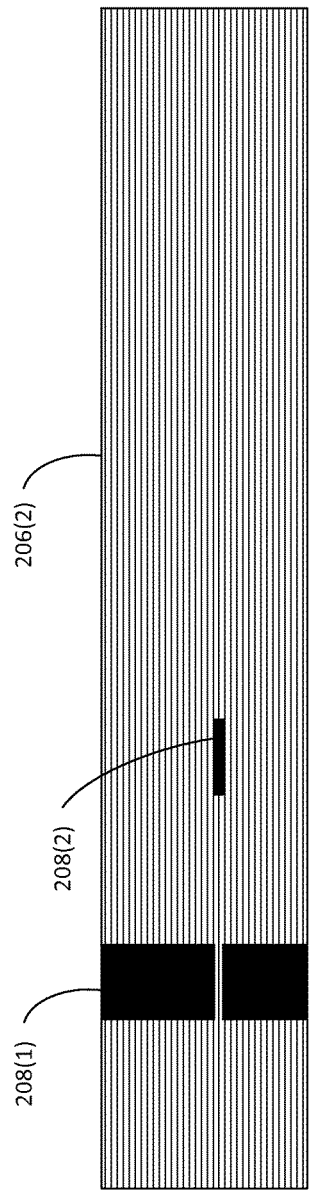
FIG. 2B is a first side view of example pages that include mismatched registration marks.

FIG. 2B is a side view of pages 206(2) of more than one physical book that include mismatched registration marks 208(1) and 208(2). In contrast to FIG. 2A, computing device 102 can detect that pages 206(2) are associated with more than one physical book based on some of pages 206(2) including registration mark 208(1) and at least one of pages 206(2) including a different registration mark 208(2).

Figure 2C:
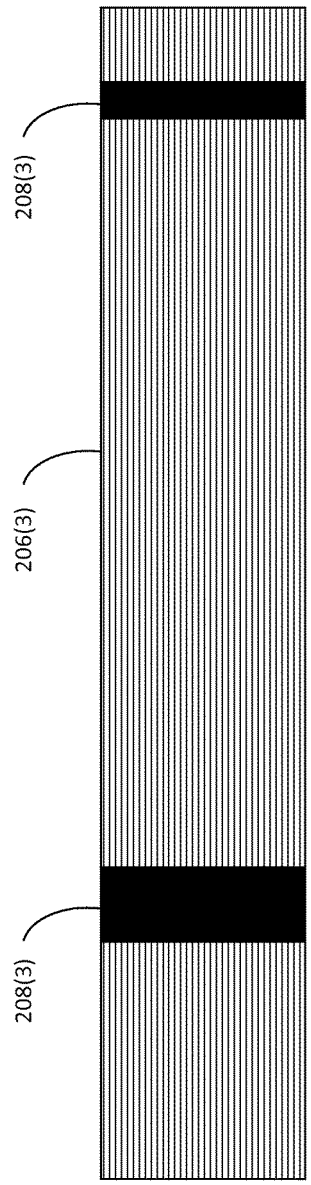
FIG. 2C is a second side view of example pages that include a matching registration mark.

FIG. 2C is a side view of pages 206(3) of a physical book that include a matching registration mark 208(3). As FIG. 2C illustrates, registration mark 208(3) includes two markings down the sides of pages 206(3), such as two visible and/or non-visible markings applied, printed, and/or created on pages 206(3). Computing device 102 can detect that pages 206(3) are associated with a single physical book based on pages 206(3) including the same or common registration mark 208(3).

Figure 2D:
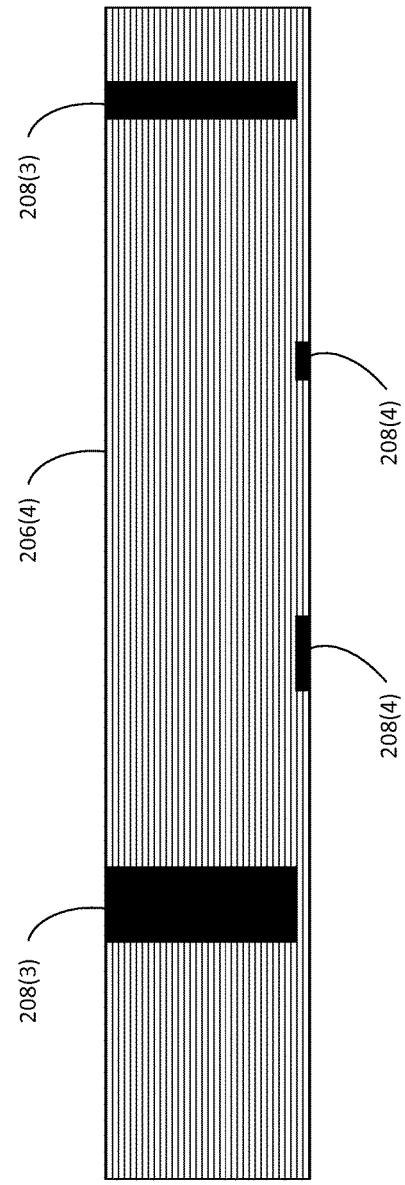
FIG. 2D is a second side view of example pages that include mismatched registration marks.

FIG. 2D is a side view of pages 206(4) of more than one physical book that include mismatched registration marks 208(3) and 208(4). In contrast to FIG. 2C, computing device 102 can detect that pages 206(4) are associated with more than one physical book based on some of pages 206(4) including registration mark 208(3) and at least one of pages 206(4) including a different registration mark 208(4).

Figure 2E:
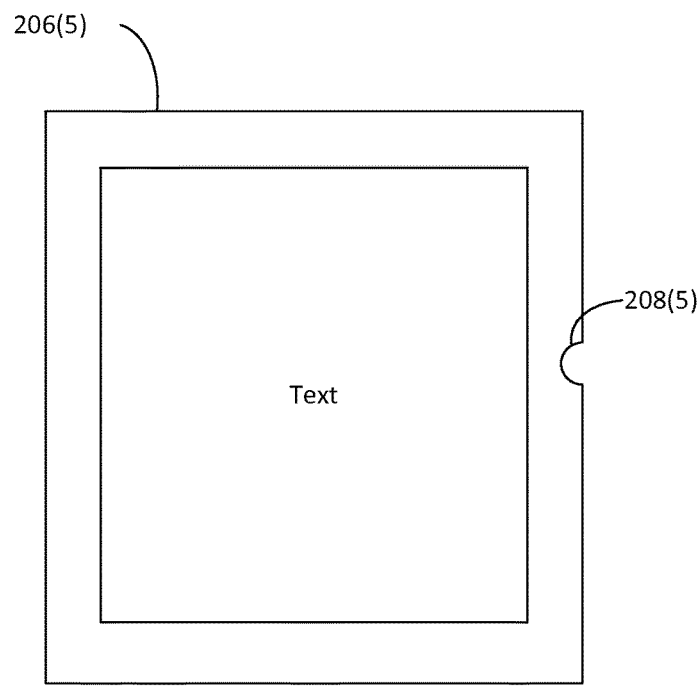
FIG. 2E is a top view of example pages that include a matching registration mark.

FIG. 2E is a top view of pages 206(5) of a physical book that include a matching registration mark 208(5). As FIG. 2E illustrates, registration mark 208(5) includes a notch or defect cut into a side of pages 206(5). Based on an image of the top (or bottom) of pages 206(5), computing device 102 can detect that pages 206(5) are associated with a single physical book based on all of pages 206(5) including the same or common registration mark 208(5).

Figure 2F:
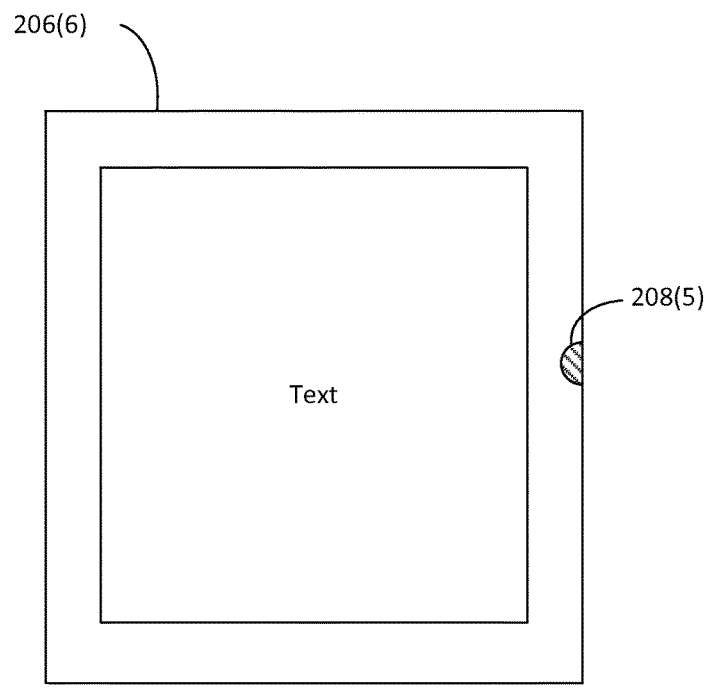
FIG. 2F is a top view of example pages that include mismatched registration marks.

FIG. 2F is a top view of pages 206(6) of more than one physical book. In contrast to FIG. 2E, computing device 102 can detect that pages 206(6) are associated with more than one physical book based on at least one of pages 206(6) not including registration mark 208(5). For example, the notch or defect (registration mark 208(5)) is not cut into all of pages 206(6), as the dashed lines within registration mark 208(5) illustrate at least one page that does not include registration mark 208(5).

Figure 3:
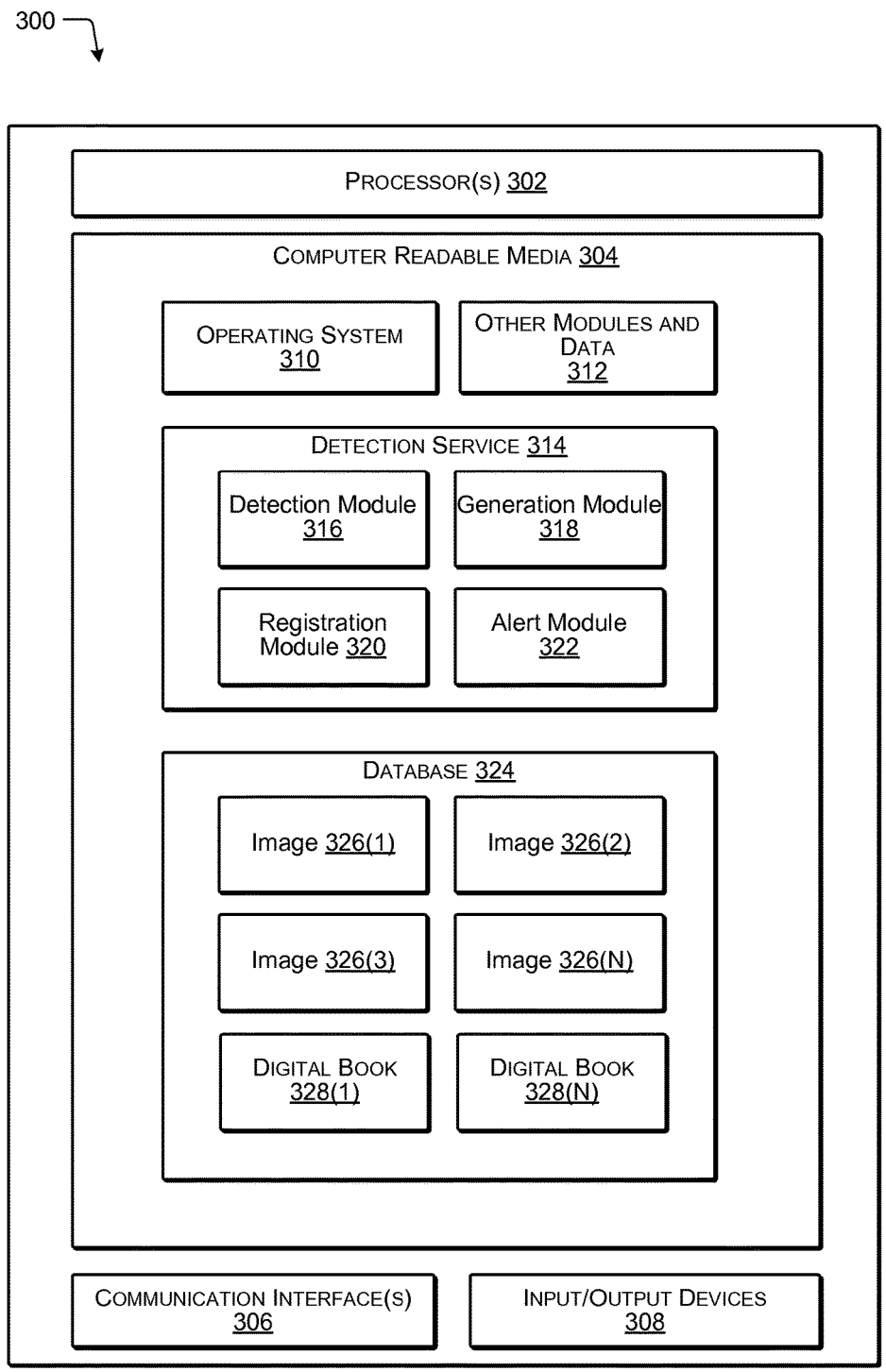
FIG. 3 is a block diagram of an illustrative computing architecture of an example computing device.

FIG. 3 is a block diagram of an illustrative computing architecture 300 of an example computing device, which can represent computing device 102. The computing architecture 300 may include one or more computing devices that may be embodied in any number of ways. Further, while the figures illustrate the components and data of the computing architecture 300 as being present in a single location, these components and data may alternatively be distributed across different computing devices and/or different locations in any manner. Consequently, the functions may be implemented by one or more computing devices, with the various functionality described herein distributed in various ways across the different computing devices. Multiple computing devices may be located together or separately, and organized, for example, as virtual servers, server banks and/or server farms. The described functionality may be provided by the servers of a single entity or enterprise, or may be provided by servers and/or services of multiple different entities or enterprises. For instance, in the case of the modules, other functional components, and data may be implemented on a server, a cluster of servers, a server farm or data center, a cloud-hosted computing service, a cloud-hosted storage service, and so forth, although other computer architectures may additionally or alternatively be used.

In the illustrated example, the computing architecture 300 may include one or more processor(s) 302, one or more computer-readable media 304, and one or more communication interface(s) 306. Each processor 302 may be a single processing unit or a number of processing units, and may include single or multiple computing units or processing cores. The processor(s) 302 can be implemented as one or more microprocessors, microcomputers, microcontrollers, digital signal processors, central processing units, state machines, logic circuitries, and/or any devices that manipulate signals based on operational instructions. For instance, the processor(s) 302 may be one or more hardware processors and/or logic circuits of any suitable type specifically programmed or configured to execute the algorithms and processes described herein. The processor(s) 302 can be configured to fetch and execute computer-readable instructions stored in the computer-readable media 304, which can program the processor(s) 302 to perform the functions described herein.

The computer-readable media 304 may include volatile and nonvolatile memory and/or removable and non-removable media implemented in any type of technology for storage of information, such as computer-readable instructions, data structures, program modules, or other data. Such computer-readable media 304 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing architecture 300, the computer-readable media 304 may be any type of computer-readable storage media and/or may be any tangible non-transitory media to the extent that non-transitory computer-readable media exclude media such as energy, carrier signals, electromagnetic waves, and signals per se.

The computer-readable media 304 may be used to store any number of functional components that are executable by the processors(s) 302. In many implementations, these functional components comprise instructions or programs that are executable by the processor(s) 302 and that, when executed, specifically configure the one or more processor(s) 302 to perform the actions attributed herein to the computing architecture 300. In addition, the computer-readable media 304 may store data used for performing the operations described herein.

In the illustrated example, the functional components stored in the computer-readable media 304 may include a detection service 314. Detection service 314 can detect whether pages that are captured within an image are associated with a single physical book or two or more physical books. For example, detection service 314 can detect whether one or more of image 326(1), image 326(2), image 326(3) and/or image 326(N) (collectively referred to as image 326 and/or images 326) include an image of pages that are associated with a single physical book or two or more physical books. Database 324 can store images 326 after an imaging device captures images 326 and sends images 326 to computing architecture 300. In some examples, each of images 326 can include an image taken by the imaging device of pages associated with a different physical book. In other examples, two or more of images 326 can include images taken by one or more imaging devices of pages that are associated with the same physical book. For instance, imaging device 104 can capture image 326(1) of pages 106 while a second imaging device can capture image 326(2) of pages 106.

Detection service 314 can detect whether pages in an image are associated with a single physical book using detection module 316. In some examples, as discussed above, detection module 316 detects whether pages in an image are associated with a single physical book by analyzing the pages in the image to determine if one or more of the pages does not include a registration mark, or includes a different registration mark. In other examples, detection module 316 detects whether pages in an image are associated with a single physical book by analyzing the pages in the image to determine that all of the pages include the same or common registration mark. Still, in other examples, detection module 316 detects whether pages in an image are associated with a single physical book by analyzing the pages in the image to determine if a threshold number of pages include (and/or do not include) the same or common registration mark.

In some examples, detection module 316 uses two or more images 326 when detecting whether pages are associated with a physical book. For instance, detection module 316 can analyze a first image 326(1) taken by a first imaging device and analyze a second image 326(2) taken by a second imaging device (and/or the first imaging device) to determine if one or more of the pages in each of image 326(1) and image 326(2) includes or does not include the registration mark. In some examples, when analyzing two or more images, detection module 316 can detect that the pages are associated with a single physical book when detection module 316 determines that all of the pages (or a threshold number of pages) in each of the images includes the same or common registration mark. In other examples, detection module 316 can detect that the pages are associated with a single physical book when detection module 316 determines that all of the pages (or a threshold number of pages) in at least one of the images includes the same or common registration mark.

Detection module 316 may include one or more image recognition algorithms, which can be used by detection module 316 to detect whether pages are associated with a physical book. For instance, in some examples, detection module 316 can include an edge detection algorithm, which is used by detection module 316 to identify points in images 326 at which the image brightness changes sharply and/or discontinues. Detection module 316 can thus utilize the edge detection algorithm to identify locations for registration marks on pages within images 326. For instance, detection module 316 can utilize the edge detection algorithm to detect points within images 326 where registration marks start and/or stop on pages. Detection module 316 can then use these points to determine whether individual pages in images 326 include a common registration mark.

In some examples, detection module 326 can further include a corner detection algorithm, which is used by detection module 316 to extract features from images 326 when detecting whether pages are associated with a physical book. For instance, detection module 316 can utilize the corner detection algorithm to extract different features from images 326, which can then be used to detect the pages and/or the registration marks on the pages within images 326. Detection module 316 can then use the extracted features to determine whether individual pages within the images 316 include a common registration mark.

In some examples, detection module 316 can further include a feature detection algorithm, which is used by detection module 316 to detect whether there is a given feature at different points within images 326 when detecting whether pages are associated with a physical book. For instance, detection module 326 can utilize the feature detection algorithm to detect whether a registration mark (i.e., feature) is located at different points within images 326. Detection module 326 can then use this detection to determine whether individual pages within images 316 include a common registration mark.

In some examples, detection module 316 can further include a line detection algorithm, which is used by detection module 316 to detect different lines within images 326 when detecting whether pages are associated with a physical book. For instance, detection module 316 can utilize the line detection algorithm to detect different lines within images 326 based on a width and/or orientation of the lines. The lines within images 326 may correspond to the registration marks on the individual pages and/or the individual pages themselves. Detection module 316 can then use this detection to determine whether individual pages within images 316 include a common registration mark.

Detection service 314 can further generate different registration marks for physical books using generation module 318. In some examples, generation module 318 creates a different registration mark for every physical book that is printed and/or made. As such, the registration mark for each physical book is unique to that physical book. For example, the registration mark may be randomly generated for each physical book to be printed and/or made. In other examples, generation module 318 creates the same or common registration mark for specific types of books. For instance, generation module 318 may create a specific registration mark for physical books depending on the genre, content, age level, rating, author, title, or the like of the book.

Detection service 314 can store the different registration marks, along with which book each registration mark is associated with, in registration module 320. In some examples, detection service 314 can further use registration module 320 when detecting whether pages in an image are associated with a single physical book. For example, detection service 314 can receive an image of pages along with an input that specifies which book the pages should be associated with. Detection service 314 can then use registration module 320 to determine if the registration mark on the pages in the image is associated with the specified book.

Detection service 314 can further provide results of the detection using alert module 322. In some examples, alert module 322 generates and provides a message indicating that pages in an image are all associated with a single physical book, or a message indicating that pages in an image are associated with two or more physical books. In some examples, alert module 322 can further generate the message to indicate which books the pages are associated with. In some examples, alert module 322 can determine which books the pages are associated with based on the registration mark on each page using registration module 340. In other examples, alert module 322 can further generate the message to indicate which pages do not include a specific registration mark.

Additional functional components stored in the computer-readable media 304 may include an operating system 310 for controlling and managing various functions of the computing architecture 300. The computing architecture 300 may also include or maintain other functional components and data, such as other modules and data 312, which may include programs, drivers, etc., and the data used or generated by the functional components. Further, the computing architecture 300 may include many other logical, programmatic and physical components, of which those described above are merely examples that are related to the discussion herein.

Computer-readable media 304 can further include database 324. In some examples, database 324 can store images 326 along with one or more digital versions of books, magazines, videos, images, or any other type of media content. For instance, database 324 can include digital book 328(1) and digital book 328(N) (collectively referred to as digital book 328 and/or digital books 328). Digital books 328 can include the digital version of any content that computing architecture 300 may use to make a physical book.

The communication interface(s) 306 may include one or more interfaces and hardware components for enabling communication with various other devices. For example, communication interface(s) 306 may facilitate communication through network 120, which can include one or more of the Internet, cable networks, cellular networks, wireless networks (e.g., Wi-Fi, cellular) and wired networks. As several examples, the computing architecture 300 may communicate and interact with other devices using any combination of suitable communication and networking protocols, such as Internet protocol (IP), transmission control protocol (TCP), hypertext transfer protocol (HTTP), cellular or radio communication protocols, and so forth.

The computing architecture 300 may further be equipped with various input/output (I/O) devices 308. Such I/O devices 308 may include a display, various user interface controls (e.g., buttons, joystick, keyboard, mouse, touch screen, etc.), audio speakers, connection ports and so forth.

In some examples, I/O devices 308 can include imaging device 104 and/or printing device 118.

FIGS. 4-10 are flow diagrams of illustrative processes for utilizing registration marks to detect mismatched pages when making a physical book. The processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The processes may be executed, at least in part, using a system, such as system 100 discussed above with reference to FIG. 1.

Figure 4:
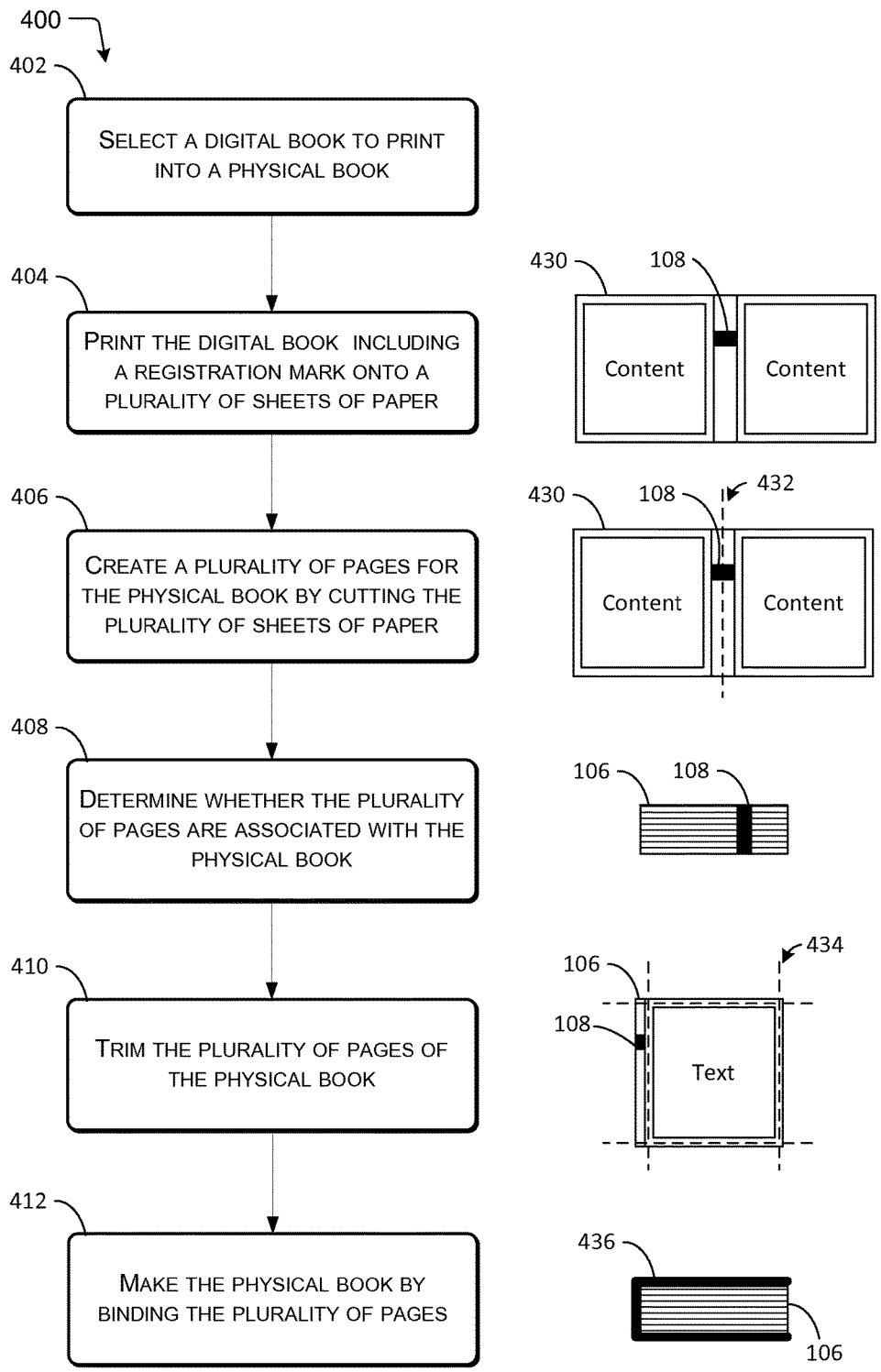
FIG. 4 is a pictorial flow diagram of an illustrative process for making a physical book.

FIG. 4 is a pictorial flow diagram of an illustrative process 400 for making a physical book. At 402, system 100 selects a digital book to print into a physical book 436. In some examples, the selection of the digital book may occur in response to receiving an order from an online marketplace to acquire physical book 436. In some examples, system 100 can receive a single order to make a single physical book 436. In other examples, system 100 can receive more than one order to make more than one physical book.

At 404, system 100 can print the digital book including registration mark 108 onto sheets of paper 430. In some examples, printing device 118 may print physical book 436 by printing two or more pages of physical book 436 onto each sheet of paper 430. Printing device 118 can further print registration mark 108 between the content of physical book 436, on one or more sides, or at any other suitable locations on each sheet of paper 430. In other examples, printing device 118 may print physical book 436 by individually printing each page 106 of physical book 436. When printing each page 106 of physical book 436, printing device 118 can further print registration mark 108 on one or more sides or at any other suitable locations on individual pages 106 of physical book 436. Alternatively, the registration mark 108 (e.g., visible, non-visible or other notches, cuts, or defects) may be applied, printed or otherwise created before, during or after printing of the pages of the physical book 436.

For instance, registration mark 108 may include any ink, toner, pigment, dye, colorant, and/or other visible or non-visible marking that can be applied, printed or otherwise created on pages 106 using a laser printer, a dot-matrix printer, an ink-jet or bubble-jet printer, a dye diffusion printer, or any other sort of printing device. For example, registration mark 108 can include a toner marking applied to pages 106 using a laser printer.

At 406, system 100 can create pages 106 for physical book 436 by cutting sheets of paper 430. In some examples, sheets of paper 430 can be cut through registration mark 108 (illustrated as cut 432), thus leaving part of registration mark 108 on each page 106 of physical book 436. In other examples, sheets of paper 430 can be cut without cutting through registration mark 108. For instance, printing device 118 may have previously applied, printed, and/or created registration mark 108 on each half of sheets of paper 430 such that after sheets of paper 430 are cut, registration mark 108 is printed and/or located on each of pages 106.

At 408, system 100 can determine that pages 106 are associated with physical book 436. In some examples, computing device 102 determines pages 106 are associated with physical book 436 by analyzing pages 106 in an image to determine that all of pages 106 include the same or common registration mark 108. In other examples, computing device 102 determines pages 106 are associated with physical book 436 by analyzing pages 106 in an image to determine that a threshold number of pages 106 include (and/or do not include) the same or common registration mark 108. Still, in other examples, a user determines whether pages 106 are associated with physical book 436 by manually checking registration mark 108 on pages 106. In such examples, the user can check whether each of pages 106 includes registration mark 108, whether a threshold number of pages 106 includes (and/or does not include) registration mark 108, and/or whether at least one of pages 106 does not include registration mark 108. The process of detecting whether or not pages 106 are associated with physical book 436 is explained in greater detail below with respect to FIGS. 6-10.

At 410, system 100 can trim pages 106 of physical book 436 to standard and/or specific dimensions. In some examples, the trimming of pages 106 can include cutting registration mark 108 off of pages 106 so that physical book 436 does not include registration mark 108, which is illustrated by dashed lines 434. In other examples, the trimming of pages 106 may not include cutting registration mark 108 off pages 106 and instead, attaching a cover of physical book 436 includes attaching the cover to pages 106 in a way that hides registration mark 108. Still, in other examples, the trimming of pages 106 may not include cutting registration mark 108 off pages 106 when registration mark 108 includes a non-visible registration mark.

At 412, system 100 can make physical book 436 by binding pages 106. For example, binding pages 106 of physical book 436 can include applying an adhesive to pages 106 and attaching a cover to the adhesive, where the adhesive and the cover create the spine of physical book 436. The cover can include, but is not limited to, a hardcover, a softcover, a dust jacket, or any other sort of protective covering that can attach to and/or bind pages 106 of physical book 436.

Figure 5:
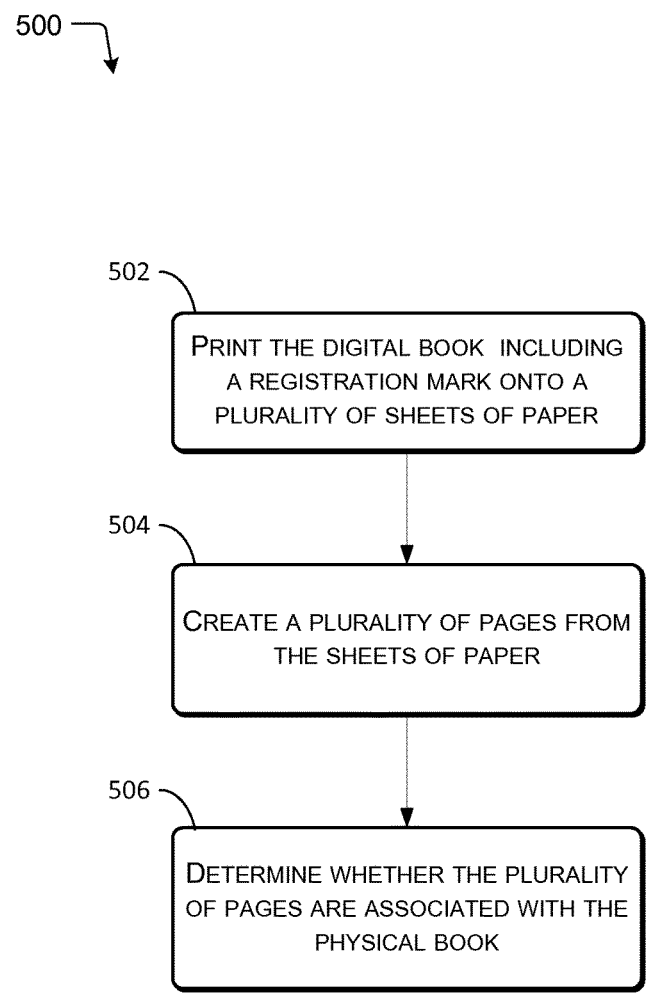
FIG. 5 is a flow diagram of an illustrative process for making a physical book.

FIG. 5 is a flow diagram of an illustrative process 500 for making a physical book. At 502, system 100 can apply, print, and/or create the digital book including registration mark 108 onto sheets of paper. In some examples, printing device 118 may apply, print, and/or create the physical book by applying, printing, and/or creating two or more pages of the physical book onto each sheet of paper. Printing device 118 can further apply, print, and/or create registration mark 108 between the content of the physical book, on one or more sides, or at any other suitable locations on each sheet of paper. In other examples, printing device 118 may apply, print, and/or create the physical book by individually applying, printing, and/or creating each page 106 of physical book. When applying, printing, and/or creating each page 106 of the physical book, printing device 118 can further apply, print, and/or create registration mark 108 on one or more sides or at any other suitable locations on individual pages 106 of the physical book. Alternatively, the registration mark 108 (e.g., visible, non-visible or other notches, cuts, or defects) may be applied, printed or otherwise created before, during or after printing of the pages of the physical book 436.

At 504, system 100 can create pages 106 for the physical book by the cutting sheets of paper. In some examples, the sheets of paper can be cut through registration mark 108, thus leaving part of registration mark 108 on each page 106 of the physical book. In other examples, the sheets of paper can be cut without cutting through registration mark 108. For instance, printing device 118 may have previously applied, printed, and/or created registration mark 108 on each half of the sheets of paper such that after the sheets of paper are cut, registration mark 108 is located on each of pages 106.

At 506, system 100 can determine that pages 106 are associated with a physical book. In some examples, computing device 102 determines pages 106 are associated with the physical book by analyzing pages 106 in an image to determine that all of pages 106 include the same or common registration mark 108. In other examples, computing device 102 determines pages 106 are associated with the physical book by analyzing pages 106 in an image to determine that a threshold number of pages 106 include (and/or do not include) the same or common registration mark 108. Still, in other examples, an employee determines whether pages 106 are associated with the physical book by manually checking registration mark 108 on pages 106. In such examples, the employee can check whether each of pages 106 includes registration mark 108, whether a threshold number of pages 106 includes (and/or does not include) registration mark 108, and/or whether at least one of pages 106 does not include registration mark 108. The process of detecting whether or not pages 106 are associated with the physical book is explained in greater detail below with respect to FIGS. 6-10.

Figure 6:
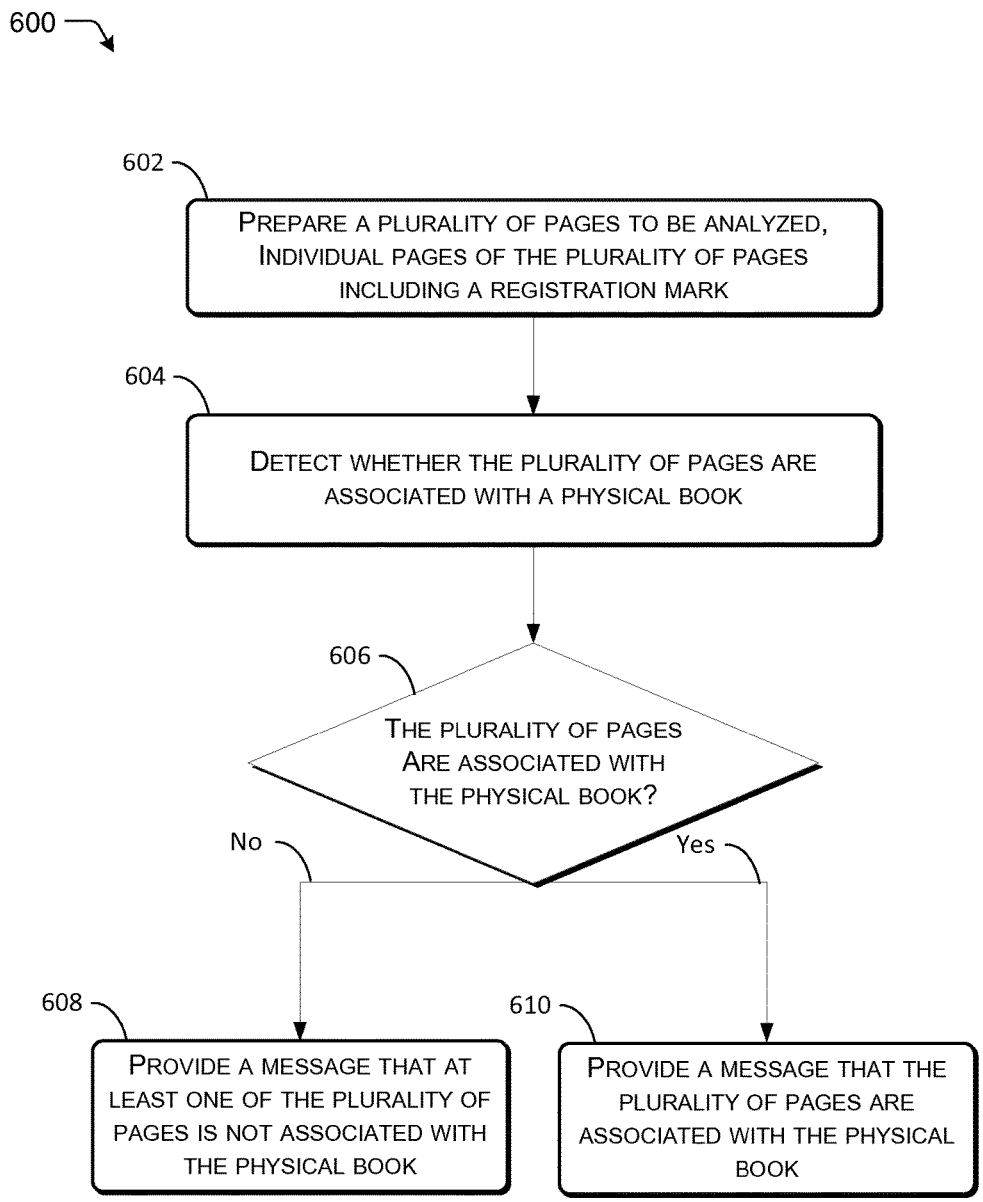
FIG. 6 is a flow diagram of an illustrative process for detecting that pages are associated with a physical book.

FIG. 6 is a flow diagram of an illustrative process 600 for detecting that pages are associated with a physical book. At 602, pages 106 can be prepared to be analyzed, where individual pages of pages 106 include a registration mark 108. In some examples, preparing pages 106 can include placing pages 106 on a binding table 110 and/or other surface for a binding process. In some examples, a securing mechanism 114 secures pages 106 to table 110, where securing mechanism 114 includes a clamp, weight, or other device that can apply pressure to the top of pages 106 in order to secure pages 106 to table 110. In some examples, securing mechanism 114 and/or connector 116 can further include one or more mechanisms that secure pages 106 in place laterally on table 110. For instance, securing mechanism 114 and/or connector 116 can include additional clamps and/or supports that help laterally secure pages 106 in place on table 110.

At 604, computing device 102 can detect whether pages 106 are associated with a physical book. In some examples, as discussed in FIG. 7, computing device 102 can detect whether pages 106 are not associated with a single physical book when at least one of pages 106 does not include the same or common registration mark 108. In other examples, also discussed in FIG. 7, computing device 102 can detect whether pages 106 are associated with a single physical book when all of pages 106 and/or a threshold number of pages 106 include (and/or do not include) the same or common registration mark 108.

At 606, if computing device 102 detects that pages 106 are not associated with a single physical book, then process 600 proceeds to 608 where computing device 102 can provide a message that indicates that pages 106 are not associated with a physical book. However, at 606, if computing device 102 detects that pages 106 are associated with a single physical book, then process 600 proceeds to 610 where computing device 102 can provide a message that indicates that pages 106 are associated with a physical book. As discussed above, providing a message can include displaying the message using a display of computing device 102 and/or sending the message to a separate computing device so that the separate computing device can provide the message.

Figure 7:
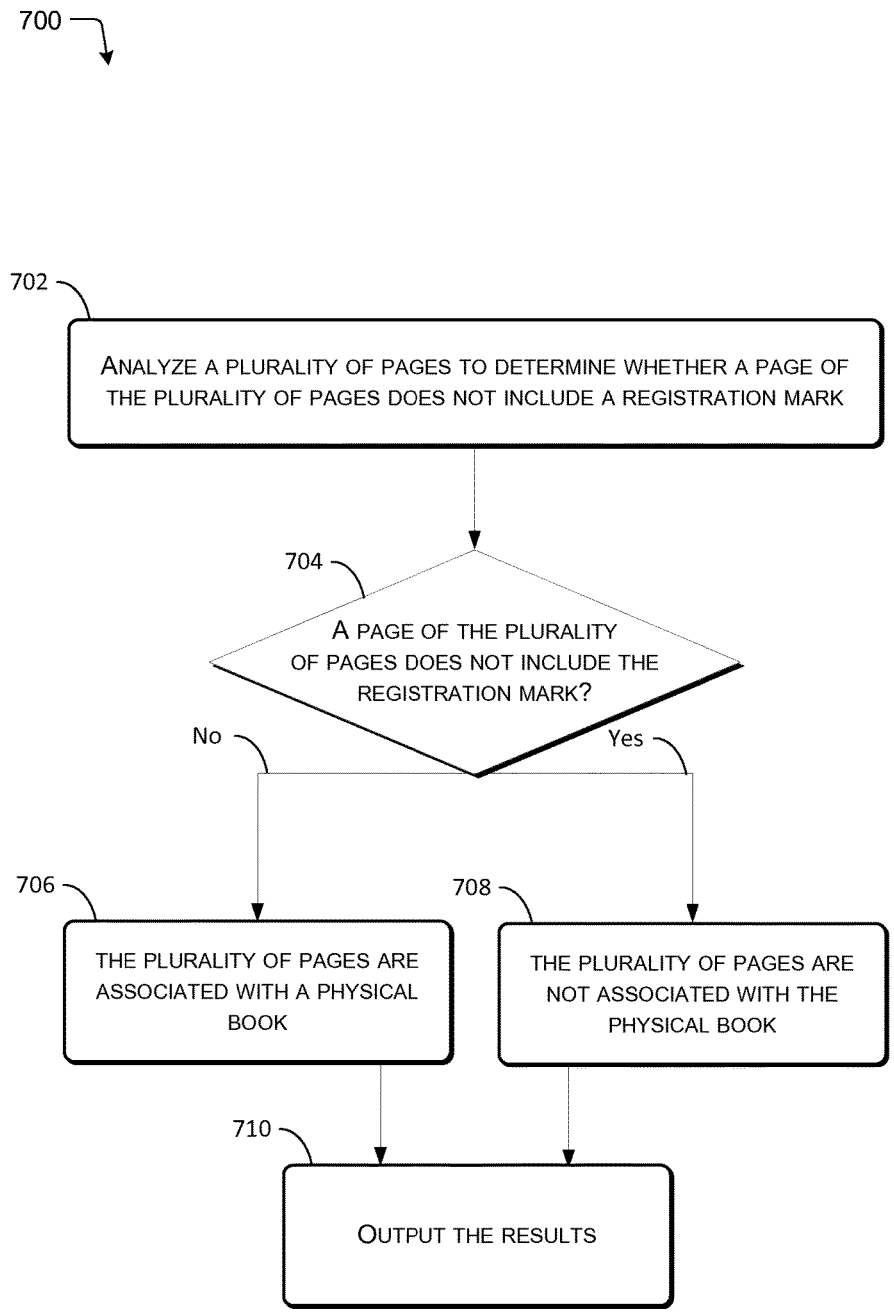
FIG. 7 is a flow diagram of an illustrative process for analyzing an image of pages to determine whether the pages are associated with a physical book.

FIG. 7 is a flow diagram of an illustrative process 700 for analyzing an image of pages to determine whether the pages are associated with a physical book. At 702, computing device 102 can analyze the image to determine whether a page of pages 106 does not include the same or common registration mark 108. In other examples (not illustrated), computing device 102 can analyze the image to determine whether all of pages 106 include the same or common registration mark 108 and/or whether a threshold number of pages 106 include (and/or do not include) the same or common registration mark 108. In some examples, computing device 102 analyzes pages 106 by analyzing an image of pages 106. In other examples, computing device 102 analyzes pages 106 by scanning pages 106 to determine that pages 106 include the same or common registration mark 108. For instance, computing device 102 can scan pages 106 while pages 106 are being fed through a binding machine and/or other type of machine that makes part and/or all of the physical book.

At 704, if computing device 102 determines that all of pages 106 include the same or common registration mark 108, then process 700 proceeds to 706 where computing device 102 determines that pages 106 are associated with a physical book. However, at 704, if computing device 102 determines that at least one page of pages 106 does not include the same or common registration mark 108, then process 700 proceeds to 708 where computing device 102 determines that pages 106 are not associated with the physical book and/or are associated with at least two physical books.

At 710, computing device 102 can output the results. In some examples, computing device 102 can output the results by displaying the results using a display of the computing device 102 (and/or a separate computing device). In other examples, computing device 102 can output the results using a speaker or other output device of computing device (and/or a separate computing device).

Figure 8:
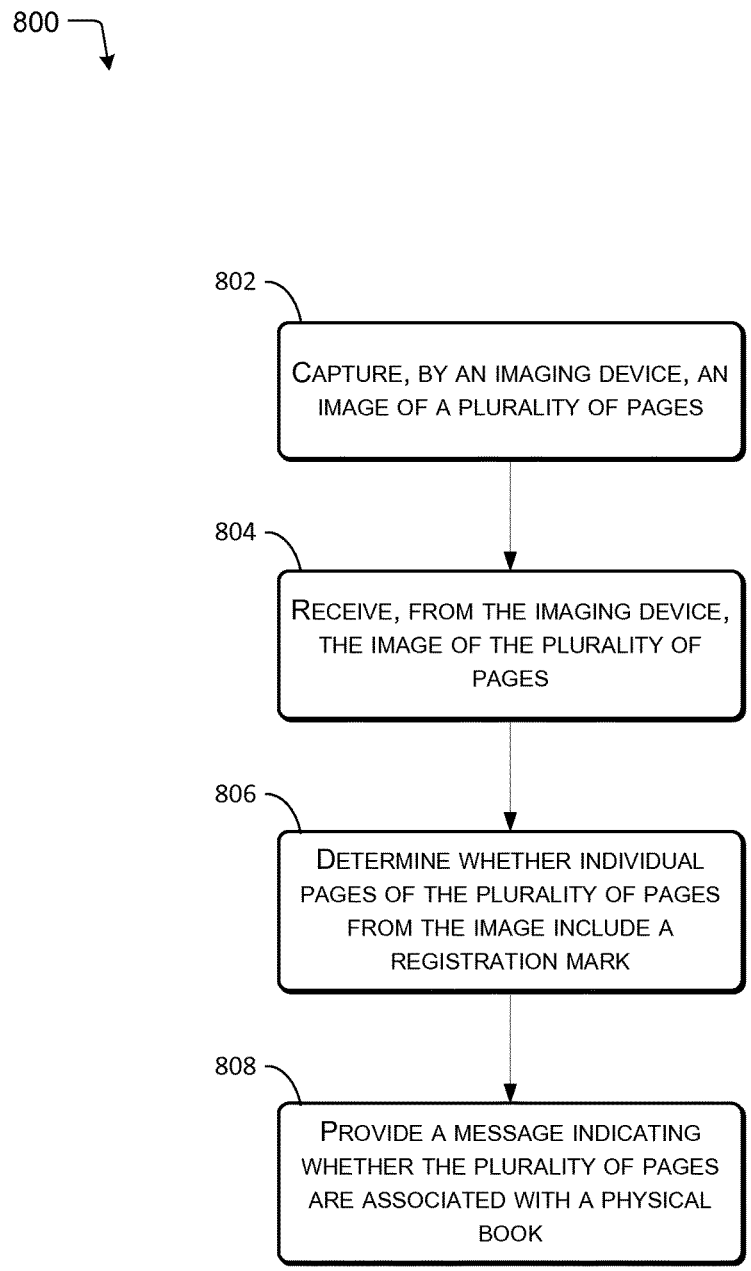
FIG. 8 is a flow diagram of an illustrative process for capturing an image of pages and using the image to determine whether the pages are associated with a physical book.

FIG. 8 is a flow diagram of an illustrative process 800 including capturing an image of pages and using the image to determine whether the pages are associated with a physical book. At 802, imaging device 104 can capture an image of pages 106. At 804, a computing device can receive, from imaging device 104, the image of pages 106. In some examples, the computing device can be separate from imaging device, such as computing device 102. In other examples, the computing device can include imaging device 104.

At 806, a computing device (such as computing device 102) can determine that individual pages of pages 106 from the image include the same or common registration mark 108. At 808, a computing device (such as computing device 102) can provide a message indicating whether pages 106 are associated with a physical book. In some examples, computing device 102 can provide a message indicating that pages 106 are associated with a physical book when each of pages 106 (and/or a threshold number of pages 106) includes the same or common registration mark 108. In other examples, computing device 102 can provide a message indicating that pages 106 are not associated with a physical book when at least one of pages 106 (and/or a threshold number of pages 106) does not include the same or common registration mark 108.

Figure 9:
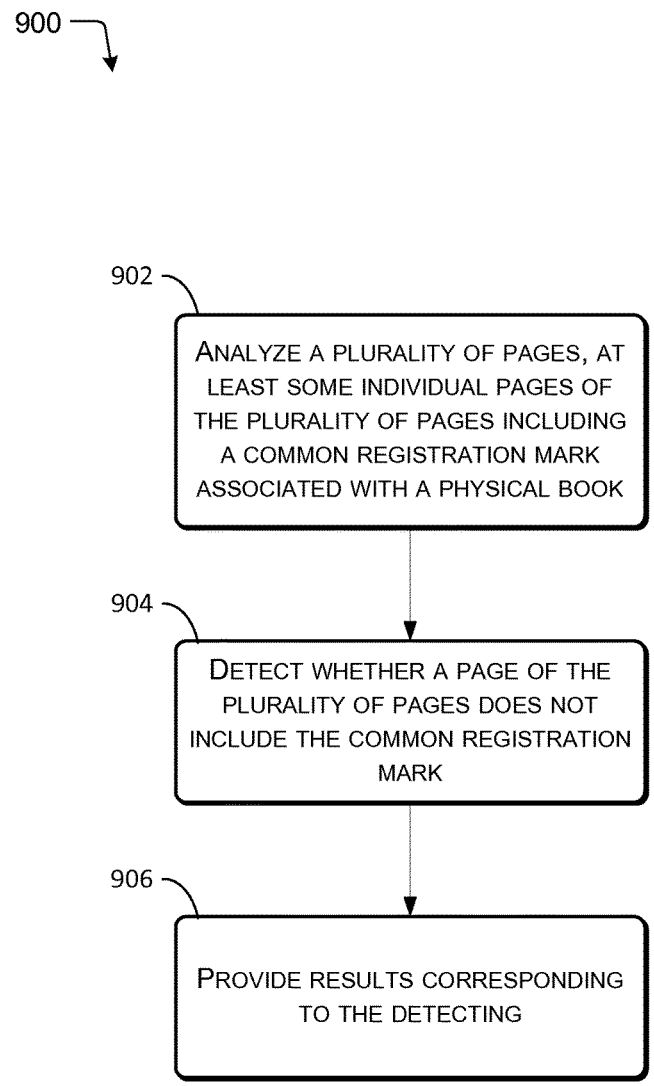
FIG. 9 is a flow diagram of an illustrative process for receiving an image of pages and analyzing the image to determine whether the pages are associated with a physical book.

FIG. 9 is a flow diagram of an illustrative process 900 including analyzing pages to determine whether the pages are associated with a physical book. At 902, computing device 102 or imaging device 104 can analyze pages 106, wherein at least some individual pages of pages 106 include registration mark 108 associated with a physical book. For instance, computing device 102 or imaging device 104 can scan pages 106 while pages 106 are being fed through a binding machine and/or other type of machine that makes part and/or all of the physical book.

At 904, computing device 102 or imaging device 104 can detect whether a page of pages 106 does not include the same or common registration mark 108. At 906, computing device 102 or imaging device 104 can provide results corresponding to the detecting. For example, computing device 102 or imaging device 104 can provide results that include an indication that all of pages 106 are associated with a physical book or an indication that pages 106 are not associated with a physical book (and/or are associated with two or more physical books).

Figure 10:
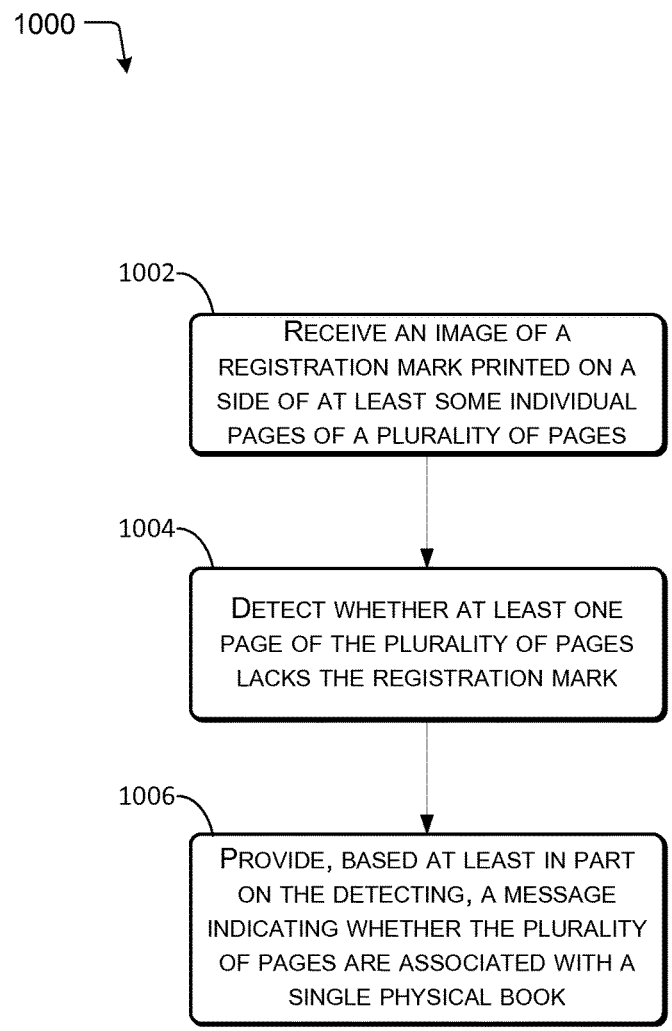
FIG. 10 is a flow diagram of an illustrative process for receiving an image of a registration mark printed on a side of pages and detecting whether the pages are associated with a physical book.

FIG. 10 is a flow diagram of an illustrative process 1000 including receiving an image of a registration mark applied, printed, and/or created on a side of pages and detecting whether the pages are associated with a physical book. At 1002, computing device 102 can receive an image of registration mark 108 applied, printed, and/or created on a side of at least some individual pages of pages 106. At 1004, computing device 102 can detect whether at least one page of pages 106 lacks registration mark (and/or includes a different registration mark). At 1006, computing device 102 can provide, based at least in part on the detecting, a message indicating whether pages 106 are associated with a single physical book.

While several possible examples are disclosed above, examples of the present disclosure are not so limited. For instance, while a system for detecting mismatched physical books is disclosed, other devices and/or components could be used without departing from the spirit of the disclosure. In addition, the location and configuration used for various devices, components, and/or features of examples of the present disclosure, such as, for example, the location and configuration of the computing device, the imaging device, the printing device, the securing mechanism, the connectors, the attachments, and the registration marks can be varied according to a particular publisher and/or other entity that makes physical books. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   one or more processors; and
   one or more computer-readable media storing instructions that, when executed by the one or more processors, cause the one or more processors to perform operations comprising:
      generate generating a registration mark that is common to pages of a copy of a physical book;
      receiving, from an electronic device, an image depicting at least an edge of a page of a plurality of pages;
      analyzing the image to determine that at least the edge of the page includes the registration mark;
      detecting, based at least in part on the edge of the page including the registration mark, that the plurality of pages are associated with the physical book; and
      providing a result that indicates that the plurality of pages are associated with the physical book.

2. The system as recited in claim 1, wherein the common registration mark is at least one of applied, printed or created on the edge of the page.

3. The system as recited in claim 1, the operations further comprising:
   receiving a digital version of the physical book;
   causing a printing device to print the digital version of the physical book on at least a portion of the plurality of pages; and
   causing the printing device to at least one of apply, print or create the common registration mark on at least the portion of the plurality of pages.

4. The system as recited in claim 1, wherein the common registration mark includes at least one of:
   a visible marking on the edge of pages the page;
   a non-visible marking on the edge of the page; or
   a notch cut into the edge of the page.

5. A method comprising:
   receiving, from an imaging device, an image depicting a plurality of pages;
   determining, by a computing device, that an edge of at least one page of the plurality of pages depicted by the image includes a common registration mark; and
   based at least in part on determining that the edge includes the common registration mark, providing a message indicating that the plurality of pages are associated with a physical book.

6. The method as recited in claim 5, wherein determining that the edge of the at least one page of the plurality of pages depicted by the image includes the common registration mark comprises analyzing, by the computing device, the image depicting the plurality of pages to determine that a respective edge of every page from the plurality of pages includes the common registration mark.

7. The method as recited in claim 5, wherein determining that the edge of the at least one page of the plurality of pages depicted by the image includes the common registration mark comprises analyzing, by the computing device, the image depicting the plurality of pages to determine that a threshold number of pages from the plurality of pages include the common registration mark.

8. The method as recited in claim 5, wherein the common registration mark includes at least one of:
   a visible mark on individual pages of the plurality of pages;
   a non-visible mark on the individual pages of the plurality of pages; or
   a defect in the individual pages of the plurality of pages.

9. The method as recited in claim 5, further comprising:
   receiving, from the imaging device, a second image depicting the plurality of pages; and determining, by the computing device, that at least one of the edge of the at least one page or an additional edge of an additional page of the plurality of pages depicted by the second image includes the common registration mark, and wherein providing the message indicating that the plurality of pages are associated with the physical book is further based at least in part on determining that the at least one of the edge of the at least one page or the additional edge of the additional page as depicted in the second image includes the common registration mark.

10. The method as recited in claim 5, further comprising:

receiving, from a second imaging device, a second image of the plurality of pages; and determining, by the computing device, that at least one of the edge of the at least one page or an additional edge of an additional page of the plurality of pages depicted by the second image includes the common registration mark, and wherein providing the message indicating that the plurality of pages are associated with the physical book is further based at least in part on determining that the at least one of the edge of the at least one page or the additional edge of the additional page as depicted in the second image includes the common registration mark.

11. One or more non-transitory computer-readable media maintaining instructions that, when executed by one or more processors, program the one or more processors to perform operations comprising:

analyzing at least a first edge of a first page and a second edge of a second page of a plurality of pages, at least the first edge of the first page including a common registration mark associated with a physical book;

detecting that the second edge of the second page of the plurality of pages does not include the common registration mark; and providing a result indicating that the plurality of pages are not associated with the physical book.

12. The one or more non-transitory computer-readable media as recited in claim 11, wherein analyzing the first edge and the second edge includes scanning the common registration mark included on the at least the first edge.

13. The one or more non-transitory computer-readable media as recited in claim 11, wherein the common registration mark includes at least one marking on the first edge.

14. The one or more non-transitory computer-readable media as recited in claim 11, wherein the common registration mark includes at least one cut or notch in the first edge.

15. The one or more non-transitory computer-readable media as recited in claim 11, the operations further comprising providing, based at least in part on detecting that the second edge of the second page does not include the common registration mark, an indication that at least the second page is not associated with the physical book.

16. The one or more non-transitory computer-readable media as recited in claim 11, wherein the plurality of pages comprises a first plurality of pages and the result comprises a first result, and wherein the operations further comprise:

analyzing at least the first edge of the first page and a third edge of a third page included in a second plurality of pages;

detecting that the third edge of the third page of the second plurality of pages includes the common registration mark; and providing a second result indicating that the second plurality of pages is associated with the physical book.

17. A computing device comprising:

one or more processors; and one or more computer-readable media storing instructions that, when executed by the one or more processors, cause the one or more processors to perform operations comprising:

receiving an image depicting a common registration mark printed on at least a first edge of a first page of a plurality of pages;

detecting that a second edge of a second page of the plurality of pages depicted by the image lacks the common registration mark; and providing, based at least in part on detecting that the second edge depicted by the image lacks the common registration mark, a message indicating that the plurality of pages are not associated with a single physical book.

18. The computing device as recited in claim 17, wherein the common registration mark includes at least one of:

a visible marking on the first edge of the first page of the plurality of pages;

a non-visible marking on the first edge of the first page of the plurality of pages; or a defect in the first edge of the first page of the plurality of pages.

19. The computing device as recited in claim 17, the operations further comprising providing, based at least in part on detecting that the second edge depicted by the image lacks the common registration mark, an indication that at least the second page is not associated with the single physical book.

20. The computing device as recited in claim 17, wherein the image comprises a first image, the plurality of pages comprises a first plurality of pages, and the message comprises a first message, and wherein the operations further comprise:

receiving a second image depicting the common registration mark printed on the first edge of the first page of a second plurality of pages, wherein the second plurality of pages does not include the second page;

detecting that at least a third edge of a third page of the second plurality of pages depicted by the second image includes the common registration mark; and providing a second message indicating that the second plurality of pages are associated with the single physical book.

* * * * *

UNITED STATES PATENT AND TRADEMARK OFFICE
CERTIFICATE OF CORRECTION

| | |
|---|---|
| PATENT NO. | : 9,754,364 B1 |
| APPLICATION NO. | : 14/720377 |
| DATED | : September 5, 2017 |
| INVENTOR(S) | : Scott William Horoho et al. |

It is certified that error appears in the above-identified patent and that said Letters Patent is hereby corrected as shown below:

In the Claims

Column 18, Line 08, change "generate generating" to --generating--.

Column 18, Line 32, change "of pages the page" to --the page--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*